(12) United States Patent
Grosser et al.

(10) Patent No.: US 11,909,606 B2
(45) Date of Patent: Feb. 20, 2024

(54) SYSTEMS AND METHODS FOR DETERMINING FLOW AND PATH ANALYTICS OF AN APPLICATION OF A NETWORK USING SAMPLED PACKET INSPECTION

(71) Applicant: Extreme Networks, Inc., San Jose, CA (US)

(72) Inventors: Donald B. Grosser, Apex, NC (US); Chun Zhang, Cary, NC (US); Patrick A. Bosa, Exeter, NH (US); Markus Nispel, Boston, MA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 17/537,160

(22) Filed: Nov. 29, 2021

(65) Prior Publication Data

US 2022/0086067 A1 Mar. 17, 2022

Related U.S. Application Data

(63) Continuation of application No. 16/130,649, filed on Sep. 13, 2018, now Pat. No. 11,190,418.

(Continued)

(51) Int. Cl.
*H04L 41/142* (2022.01)
*H04L 43/028* (2022.01)
(Continued)

(52) U.S. Cl.
CPC ........... *H04L 43/028* (2013.01); *H04L 41/12* (2013.01); *H04L 41/142* (2013.01); *H04L 43/12* (2013.01);
(Continued)

(58) Field of Classification Search
CPC ..... H04L 43/028; H04L 41/12; H04L 41/142; H04L 43/12; H04L 43/18; H04L 43/0852; H04L 69/22; H04L 41/0894; H04L 43/022
See application file for complete search history.

(56) References Cited

U.S. PATENT DOCUMENTS 7,031,304 B1    4/2006  Arberg et al.
8,005,000 B1    8/2011  Srinivasan
(Continued)

FOREIGN PATENT DOCUMENTS

WO    WO 2017/184627 A2    10/2017

OTHER PUBLICATIONS

Phaal et al.—InMon Corporation's sFlow: A Method for Monitoring Traffic in Switched and Routed Networks—Network Working Group The Internet Society, Dated Sep. 2001 (Request for Comments: 3176) (Year: 2001).*

(Continued)

*Primary Examiner* — Edan Orgad
*Assistant Examiner* — Malick A Sohrab
(74) *Attorney, Agent, or Firm* — Sterne, Kessler, Goldstein & Fox P.L.L.C.

(57) ABSTRACT

Systems and methods are disclosed herein for monitoring health of each switch of a plurality of switches on a network by selectively mirroring packets transmitted by each switch of the plurality of switches. In some embodiments, control circuitry generates a plurality of mirroring parameters, each mirroring parameter comprising an instruction to mirror a respective type of packet. The control circuitry transmits the plurality of mirroring parameters to each switch of the plurality of switches on the network, and receives, from a switch, a packet that was mirrored by the switch according to a mirroring parameter of the plurality of mirroring param- (Continued)

eters. The control circuitry determines the respective type of the packet, executes an analysis of contents of the packet based on the respective type of the packet, and determines a health of the switch based on results of the analysis.

20 Claims, 7 Drawing Sheets

Related U.S. Application Data (60) Provisional application No. 62/592,106, filed on Nov. 29, 2017.

(51) Int. Cl.
  *H04L 43/12* (2022.01)
  *H04L 41/12* (2022.01)
  *H04L 43/18* (2022.01)
  *H04L 69/22* (2022.01)
  *H04L 43/0852* (2022.01)

(52) U.S. Cl.
  CPC .......... *H04L 43/18* (2013.01); *H04L 43/0852* (2013.01); *H04L 69/22* (2013.01)

(56) References Cited

U.S. PATENT DOCUMENTS

| | | | |
|---|---|---|---|
| 8,520,540 B1* | 8/2013 | Foschiano | H04L 43/106 370/252 |
| 10,397,116 B1 | 8/2019 | Volpe et al. | |
| 2004/0131059 A1* | 7/2004 | Ayyakad | H04L 45/60 370/252 |
| 2006/0059163 A1 | 3/2006 | Frattura et al. | |
| 2013/0054737 A1 | 2/2013 | Miranda et al. | |
| 2014/0280211 A1 | 9/2014 | Rash et al. | |
| 2014/0280889 A1* | 9/2014 | Nispel | H04L 63/029 709/224 |
| 2015/0085694 A1 | 3/2015 | Agarwal et al. | |
| 2015/0092605 A1* | 4/2015 | Aybay | H04L 47/12 370/254 |
| 2015/0215841 A1 | 7/2015 | Hsu et al. | |
| 2015/0341316 A1 | 11/2015 | Basso et al. | |
| 2016/0065423 A1* | 3/2016 | Zhang | H04L 43/12 370/235 |
| 2016/0119288 A1 | 4/2016 | Ardeli et al. | |
| 2016/0165365 A1 | 6/2016 | Liu | |
| 2016/0352601 A1* | 12/2016 | Zhang | H04L 43/0829 |
| 2016/0380924 A1 | 12/2016 | Sivasankar et al. | |
| 2017/0034065 A1* | 2/2017 | Iwakura | H04L 47/115 |
| 2017/0142014 A1* | 5/2017 | Vincent | H04L 47/31 |
| 2019/0166021 A1 | 5/2019 | Grosser et al. | |

OTHER PUBLICATIONS

International Search Report and Written Opinion of the International Searching Authority for International Application No. PCT/US2018/062794, dated Feb. 4, 2019 (12 pages).

Phaal et al., InMon Corporation's Flow: A Method for Monitoring Traffic in Switched and Routed Networks—Network Working Group The Internet Society, Dated Sep. 2001 (Request for Comments: 3176) (Year: 2001).

* cited by examiner

SYSTEMS AND METHODS FOR DETERMINING FLOW AND PATH ANALYTICS OF AN APPLICATION OF A NETWORK USING SAMPLED PACKET INSPECTION

CROSS REFERENCE TO RELATED APPLICATIONS

This application claims priority to U.S. Non-Provisional application Ser. No. 16/130,649, filed on Sep. 13, 2018, which claims the benefit of U.S. Provisional Application No. 62/592,106, filed on Nov. 29, 2017, the contents of each is hereby incorporated by reference in their entireties.

BACKGROUND

The present disclosure relates to systems and methods for determining flow and path analytics of a network using sampled packet inspection. These flow and path analytics may be used to monitor metrics affecting a network (e.g., status of an application used by the network).

SUMMARY

Systems and methods are provided herein for monitoring a status of an application used by a network. More specifically, control circuitry of a central server of the network may circulate a configuration to each switch of the network, the configuration indicating rules dictating which packets are to be mirrored to the central server. Following the configuration, each respective switch of the network may transmit a subset of packets processed by the respective switch, the subset being formed of packets that match the rules. Based on an analysis of the subset of packets received from each switch, the central server is able to determine a status of an application used by the network, and is additionally able to determine other information about the network (e.g., topology information, health of a given switch, etc.).

Systems and methods are provided herein for monitoring a status of an application used by a network by selectively mirroring packets transmitted by each switch of a plurality of switches on the network. In some embodiments, control circuitry (e.g., of a server) generates a plurality of mirroring parameters, each mirroring parameter comprising an instruction to mirror a respective type of packet. The control circuitry transmits the plurality of mirroring parameters to each switch of the plurality of switches on the network.

When a switch detects a packet corresponding to a mirroring parameter, the control circuitry receives, from the switch, a packet that was mirrored by the switch according to a mirroring parameter of the plurality of mirroring parameters. The control circuitry then determines the respective type of the packet, and executes an analysis of contents of the packet based on the respective type of the packet. The control circuitry then determines a status of an application used by the network based on results of the analysis.

In some embodiments, the respective type of the packet is a synchronization packet ("SYN packet"). Moreover, an additional packet is received from the switch of a synchronization-acknowledgement ("SYN-ACK packet") type (e.g., because a SYN-ACK packet type is indicated by the plurality of mirroring parameters). Following this embodiment, the control circuitry, when executing the analysis, may determine a difference in time between when the SYN packet was received and when the SYN-ACK packet was received. The control circuitry then, when determining the status of the application, may compare the difference in time to a threshold, and, in response to determining that the difference in time exceeds the threshold, may determine that the response time for an application used by the network is poor. For example, the control circuitry may determine that a Transmission Control Protocol (TCP) application run on the network (i.e., an application that relies on SYN/SYN-ACK packets) is poor, that the health of the switch that mirrored the packets is poor, or any other issue that is determined to result in poor application performance.

In some embodiments, the respective type of the packet is a domain name system packet ("DNS packet"). In such embodiments, the control circuitry, when executing the analysis, may determine a speed at which the DNS packet was received. For example, the speed may be determined by comparing a time at which a DNS request is made to a time at which a DNS reply is received from a DNS server. When determining the status of the application, the control circuitry may compare the speed to a threshold, and, in response to determining that the speed is below the threshold, the control circuitry may determine that the speed of the network used by the network is poor. The speed may be affected by a failing of the switch that mirrored the packet, a different switch or different component of the network (e.g., the DNS server), or an application being used by the server.

Furthermore, the control circuitry may determine an activity of the switch by extracting, from the DNS packet, a type of service and a type of application, and may log the type of service and the type of application accessed by the switch (e.g., in storage circuitry of the server).

In some embodiments, the respective type of the packet is a dynamic host configuration protocol packet ("DHCP packet"). The control circuitry may execute the analysis by determining an identity of an end device that triggered receipt of the DHCP packet by the switch, and may log the identity of the end device.

In some embodiments, the respective type of the packet is a dynamic host configuration protocol packet ("DHCP packet"). In such embodiments, the control circuitry, when executing the analysis, may determine an identity of an operating system that triggered receipt of the DHCP packet by the switch. The control circuitry may then log the identity of the operating system.

In some embodiments, the respective type of the packet is a hyper text transfer protocol ("HTTP") packet ("HTTP packet"). In such embodiments, the control circuitry may execute the analysis by extracting an HTTP header from the HTTP packet, and then determining at least one of a browser and a uniform resource locator ("URL") identified within the HTTP header. The control circuitry may thereby identify an application from which data is being requested by the packet based on the at least one of the browser and the URL.

In some embodiments, the respective type of the packet is a secure socket layer ("SSL")/Transport Layer Security ("TLS") packet ("SSL/TLS packet"). In such embodiments, the control circuitry, when executing the analysis, may identify an SSL/TLS certificate corresponding to data flow of the packet. The control circuitry may then extract information from the SSL/TLS certificate, and may determine an identity of a service providing the data flow. The control circuitry may log the identity of the service. When extracting the information from the SSL/TLS certificate, the control circuitry may determine a version of a cypher key of the certificate, and may compare the version to a current version. The control circuitry may determine that the version and the current version do not match, and, in response to determining that the version and the current version do not match, the control circuitry may determine that the cypher key is outdated. The control circuitry may log the determination that the cypher key is outdated.

In some embodiments, the respective type of the packet is an authentication packet. In such embodiments, the control circuitry, when executing the analysis, may extract authentication data from the authentication packet. The control circuitry may determine an identity of a user who is using an end device that caused the packet to be encountered by the switch, and may log the identity of the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems, methods, and apparatuses are disclosed herein for monitoring a status of one or more applications used by the network, and learning network topology information, by way of mirroring network packets from network switches to one or more servers implemented for network monitoring. The status of an application used by a network may be monitored by mirroring packets that pass through a switch to a node that examines the packets for signs of application status, health, and other information. Such an approach, however, is not suitable for monitoring health of many switches on a network because it would require more processing power than practically feasible.

Figure 1:
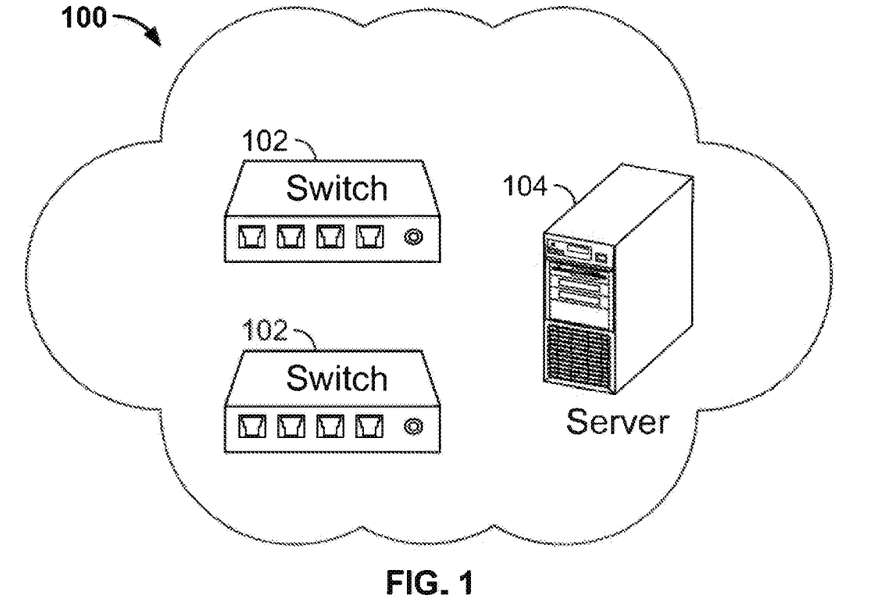
FIG. 1 depicts an illustrative system including a network of switches and a server, in accordance with some embodiments of the disclosure.

FIG. 1 depicts an illustrative system including a network of switches and a server, in accordance with some embodiments of the disclosure. As depicted in FIG. 1, network 100 includes various switches 102, and server 104. While depicted as one server, server 104 may comprise a plurality of servers. In some embodiments of the disclosure, a network monitoring device (not depicted) may be coupled to each switch 102, and each switch 102 may mirror some or all packets to the network monitoring device. However, deploying such a network monitoring device to every switch 102 on network 100 is an impractical and expensive solution to monitoring application status, as well as network topography and health, of network 100.

In some embodiments, switches 102 of network 100 have an ability to mirror all incoming packets to a remote monitoring device (e.g., server 104). For example, switches 102 may be pre-configured to mirror packets to server 104 using the Encapsulated Remote Switched Port Analyzer ("ERSPAN") protocol. However, this would require server 104 to process all received packets from all switches 102 on network 100. This is disadvantageous because the processing power to analyze all of these packets would make server 104 extremely expensive.

In a preferred embodiment of the disclosure, server 104 may have a defined set of packet filters. For example, server 104 may have an access control list (ACL) that dictates what packets should (and/or should not) be mirrored from switches 102 to server 104. The ACL may include a set of highly tuned filters that minimizes an amount of packets mirrored to server 104, while still ensuring that the mirrored packets provide a high level of visibility into network health, as well as applications used by the network and/or users, and factors that affect user experience.

Server 104 may transmit the ACL to each switch 102 and command each switch 102 to mirror packets that match a mirroring parameter of the ACL. The ACL forms a stateless set of parameters, and thus, switches 102 are able to process the ACL in an efficient manner such that the ACL can be evaluated against each packet without having an impact on the forwarding rate of a given switch 102. Switches 102 may mirror packets based on a match between a mirroring parameter of the ACL and a parameter of the packet, as well as based on a mirroring command through ERSPAN.

Figure 2:
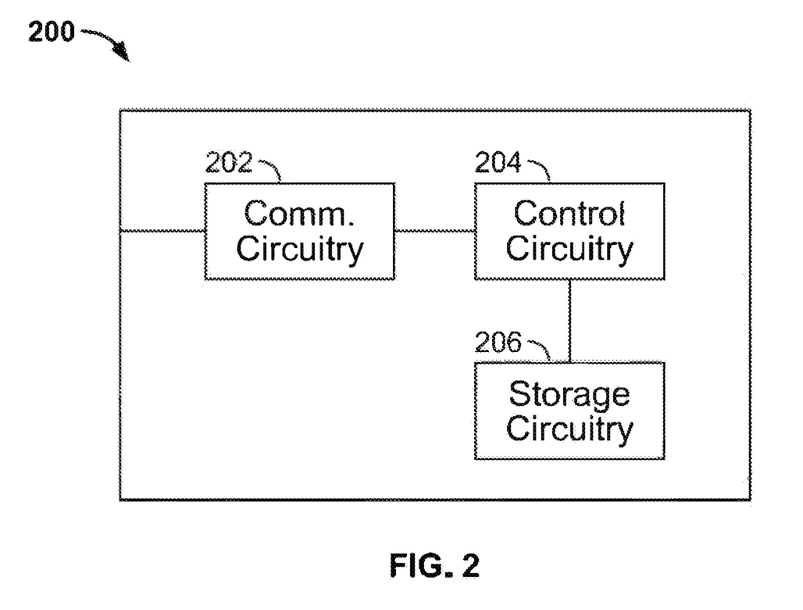
FIG. 2 depicts an illustrative server that is configured to monitor status of one or more applications on the network and receive selectively mirrored packets, in accordance with some embodiments of the disclosure.

FIG. 2 depicts an illustrative server that is configured to monitor status of one or more applications on the network and receive selectively mirrored packets, in accordance with some embodiments of the disclosure. Server 200, depicted in FIG. 2, is an exemplary server of a network (e.g., server 104 of network 100). Server 200 includes illustrative components, such as communications circuitry 202, storage circuitry 206, and control circuitry 204. While server 200 is a server, the components of server 200 be implemented by any switch, such as switches 102. Communications circuitry 202 may be any known receiver, transmitter, transceiver, or any other known means of transmitting and/or receiving data. Storage circuitry 206 may be any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 204 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions stored in memory (i.e., storage circuitry 206).

In addition to filtering and ERSPAN capabilities, switches 102 are capable of sending samples of received and transmitted network packets using a standard protocol called sFlow. For example, control circuitry 204 of server 104 may instruct one or more switches 102 to mirror one packet out of every N packets (e.g., 1024 packets) to server 104. The sFlow packet may include auxiliary information, such as an indication of an ingress and egress port of a sampled packet.

In order to maintain the packet filters, control circuitry 204 of server 104 may periodically transmit (e.g., by way of communications circuitry 202) a configuration to switches 102. The configuration may include instructions for each switch 102 to send sFlow packets for all active ports to server 104, and to mirror packets matching a mirroring parameter of an ACL. Advantageously, having server 104 mitigate the maintenance and updating of the configuration files for switches 102 avoids switches 102 needing to use Command Line Interface (CLI) to perform such configuration, which can be time consuming and error prone.

As part of monitoring the health of network 100 (e.g., by monitoring a status of an application used by the network), server 104 may monitor network performance that may impact the experience of a user that transmits packets over network 100. For example, by measuring the time between an initial network connection request from a user and a connection response from a requested service, server 104 may sample the responsiveness of network 100 along the path of the user's client to the requested service. With enough such samples, server 104 is able to measure whether network performance is contributing to less-than-ideal user experience.

To measure user experience, in some embodiments, control circuitry 204 of server 104 transmits an instruction to switches 102 to mirror Synchronization (SYN) and Synchronization-Acknowledge (SYN-ACK) packets to server 104. When control circuitry 204 of server 104 receives mirrored SYN and SYN-ACK packets, control circuitry 204 computes a response time as the time between a time stamp of the SYN packet and the corresponding SYN-ACK packet. Typically, Transmission Control Protocol (TCP) and other web-based flows start with a SYN packet being sent from a client to a server. The server acknowledges the client by way of sending a SYN-ACK packet to the client. By filtering for such packets, server 104 is informed of an approximate response time for every web-based flow, and is able to determine a status of applications (e.g., TCP applications) associated with the SYN/SYN-ACK packets.

Control circuitry 204 of server 104 may store determined network response time at given points of time for given switches 102 at storage circuitry 206. Control circuitry 204 may store additional identifying information for each logged network response time. For example, measurements may be stored in relation to a given application being used, a client ID, a server or service ID relating to the server or service being communicated with by a client, or even an identifier of which switch 102 mirrored the packet. Control circuitry 204 may determine therefrom which elements of network 100 are causing a degradation of user experience, and may log the identity of these elements using storage circuitry 206.

In some embodiments, a SYN/SYN-ACK data flow may be one-sided. For example, a given switch 102 may transmit a SYN packet toward a destined service, but no SYN-ACK packet is responsively received from the service. Control circuitry 104 may track when one-sided flows are mirrored, and at which switches 102 a one-sided flow originates. Control circuitry 104 may determine that one-sided flows occur at switches that are far away from a service (e.g., a high amount of hops), but that the flows are two-sided (e.g., a SYN-ACK message is received) at switches that are close to the service. Control circuitry 204 may responsively determine that a SYN-ACK packet was dropped from the queue of a port of a switch 102 along the flow, and may determine where the SYN-ACK packets are being dropped to determine negative network health at that switch, or some other application status that is causing the flow to be one-sided. Control circuitry 204 may store this information using storage circuitry 206.

Control circuitry 204 of server 104 may transmit instructions to switches 102 to mirror dynamic host configuration protocol ("DHCP") traffic. The control circuitry may resolve therefrom information about the end system that is connecting to the network. For example, control circuitry 204 may determine, from the DHCP communications, the type of end device communicating with switch 102 that mirrored the traffic (e.g., smart phone), and/or the operating system that the end device is using. Control circuitry 204 may store this information using storage circuitry 206.

In some embodiments, control circuitry 204 of server 104 may transmit instructions to switches 102 to mirror hyper text transfer protocol ("HTTP") requests to server 104. Control circuitry 204 of server 104, when receiving mirrored HTTP requests (e.g., by control circuitry 204), may extract header information from the HTTP requests. Control circuitry 204 may identify, from the header information, a browser being used by an end device. Additionally, control circuitry 204 may identify, from the header information, a uniform resource locator (URL) being retrieved. Control circuitry 204 may additionally identify, from the HTTP request, an application flow (e.g., from what application data is being requested from). Control circuitry 204 may store this information using storage circuitry 206.

In some embodiments, control circuitry 204 of server 104 may transmit instructions to switches 102 to mirror Secure Socket Layer ("SSL")/Transport Layer Security ("TLS") certificates. Control circuitry 204 of server 104, when receiving a mirrored SSL/TLS certificate, may parse information in the SSL/TLS certificate to identify a service corresponding to the certificate, as well as a security hash key length, a version of a cypher key, and the like. Control circuitry 204 may determine, based on the version of the cypher key, whether the certificate is out of date. Control circuitry 204 may determine, if the certificate is out of date, that the data flow corresponding to the certificate may not be secure, or may be malicious. Control circuitry 204 may store this information using storage circuitry 206.

In some embodiments, control circuitry 204 of server 104 may transmit instructions to switches 102 to mirror user authentication data to server 104. For example, data in the Remote Authentication Dial-In User Service ("RADIUS") protocol or the Kerberos protocol, common authentication protocols, may be mirrored to server 104. Control circuitry 204 of server 104, when receiving mirrored authentication data, may determine therefrom an identity of a user who is using an end device that is communicating with the respective switch 102 from which the authentication data was mirrored. Control circuitry 204 may store this information using storage circuitry 206.

Control circuitry 204 of server 104 may monitor what applications are being used by end clients of network 100 based on what packets are mirrored. To this end, in some embodiments, control circuitry 204 of server 104 may transmit instructions to switches 102 to perform a deep packet inspection of each packet passing through switch 102, and to determine whether a given packet contains data matching a predetermined pattern at a predetermined location (e.g., at a certain distance in the payload using layer 2, 3, or 4 offsets, or in the header). Switch 102, per the instructions from server 104, may mirror packets to server 104 that have such a matching pattern. Discussion of how deep packet inspection may be used to identify an application or web site of a network flow is described in a commonly-owned patent to Rash et al. U.S. Pat. No. 9,256,636, issued Feb. 9, 2016. For example, control circuitry 204 may access an application identification library that includes known signatures information about one or more respective known signatures in the form of signals arranged in patterns determined to be indicative of characteristics the respective computer applications. Control circuitry 204 may examine contents of frames received at a device (e.g., at switch 102) to detect signals arranged in patterns corresponding to signatures information. Control circuitry 204 may match the patterns from the frames with the known signatures information to determine a likely computer application that is attempting to run on the network system. In some embodiments, other techniques described in the U.S. Pat. No. 9,256,636 may also be used.

In some embodiments, to monitor what applications are being used by end clients of network 100, control circuitry 204 may transmit an instruction to switches 102 to mirror Domain Name System ("DNS") requests. When server 104 receives mirrored DNS requests (e.g., by way of communications circuitry 202), the control circuitry is able to identify an application corresponding to the request, and is able to determine network speed. For example, DNS is used to resolve most network communications, and if DNS is operating slowly, then this slow operation impacts user experience. Moreover, filtering for DNS communications provides information about what service and type of application is being used. For example, control circuitry 204 may determine from a DNS request an IP address for an application, and thereby resolve an application name and type (e.g., that the application is a video streaming application from a given service). Control circuitry 204 may store this information using storage circuitry 206.

Control circuitry may build, from the aforementioned mirrored DNS information, an address-to-name cache (e.g., at storage circuitry 206). For example, prior to a client application sending a request to a server (or making an initial connection to a server), the application must know the IP address of the server. DNS transactions are used for precisely this purpose, and thus, the DNS server will respond with one or more IP addresses for the requested server or service. When the client has this IP address, the client will send a request or attempt to establish a connection with that server using the IP address returned by the DNS server. As server 104 is aware, by building the address-to-name cache, of the server being accessed by the data flow, when a subsequent message is received by server 104 (e.g., a mirrored TCP SYN packet), the address-to-name cache may be used by server 104 to look up the name of the server. Server 104 can then identify and classify the flow (e.g., by noting a health of network communications with that specific service). Server 104 may store (e.g., at storage circuitry 206) the identified application along with other flow data, indexed by a flow identifier ("flow ID"). The term "flow ID" may be, for example, a combination of client IP address, client port, server IP address, server port, and protocol.

In some embodiments, control circuitry 204 of server 104 may transmit instructions to switches 102 to mirror Quick Unified Data Protocol ("UDP") Internet Connections ("QUIC.") protocol packets. Control circuitry 204 may determine, by decoding the QUIC protocol packets, an identity of an application accessed by an end device. Control circuitry 204 may store this information using storage circuitry 206.

In some embodiments, control circuitry 204 of server 104 may transmit instructions to switches 102 to mirror client HELLO and server HELLO messaging. HELLO messaging occurs at the application layer of the network stack, and thus control circuitry 204 may determine response time of an application itself by analyzing time stamps associated with these HELLO messages (as opposed to network response time determined from analyzing SYN/SYN-ACK messages). Control circuitry 204 may store this information using storage circuitry 206.

In some embodiments of the disclosure, control circuitry 204 of server 104 is enabled to determine path flows and topology information across network 100 based on information derived from mirrored packets. More specifically, because server 104 receives mirrored packets from all switches 102 of network 100, control circuitry 204 of server 104 is able to determine the full flow of each application flow traveling across network 100 from services to end devices. Thus, for each individual flow (i.e., from client to service and vice versa), server 104 may track metrics such as number of flows, number of sampled packets, number of unique clients, average response time, etc. These may be tracked for each switch 102 of network 100, or for each client or service. These metrics may be stored at storage circuitry 206 of server 104.

In some embodiments, control circuitry 204 of server 104 may determine network elements, such as switches 102 or services of network 100, that are anomalously slow (e.g., compared to a threshold minimum normal network speed). Control circuitry 204 may perform this analysis by considering response time of a given network element over a period of time (e.g., based on mirrored SYN/SYN-ACK packets, as discussed above). Control circuitry 204 may determine an average response time from each switch 102 as compared to an average response time from an adjacent network element, and may thereby compute, on a hop-by-hop basis, a latency introduced by each switch 102 along an application flow. Control circuitry 204 may then alert a network administrator (e.g., by sending an e-mail, producing a syslog message, executing a custom switch, etc.) of abnormally slow network elements. Control circuitry 204 may annotate the alert with latency data for each slow network element. Additionally, control circuitry 204 may store this information using storage circuitry 206.

Similarly, control circuitry 204 may determine across several periods whether a given switch that was previously slow remains slow in subsequent periods. For example, if a given switch 102 was slow during a previous period remains slow for a threshold number of periods in a row (e.g., 3 periods), the aforementioned alert may be triggered to notify a network administrator about the potentially faulty switch. The length of time of the periods may be changed by a network administrator, as well as the threshold number of periods for an alert to form.

In some embodiments, server 104 may be provided with a topology map of the topology of network 100. Server 104 may determine the topology map, or may be provided the topology map from a network administrator. Server 104 may populate a visualization of the topology map with visuals depicting port level connectivity, location data, port queue, and resource utilization data by generating for display the aforementioned metrics as an overlay on top of an individual element of network 100 on the topology map.

Figure 3:
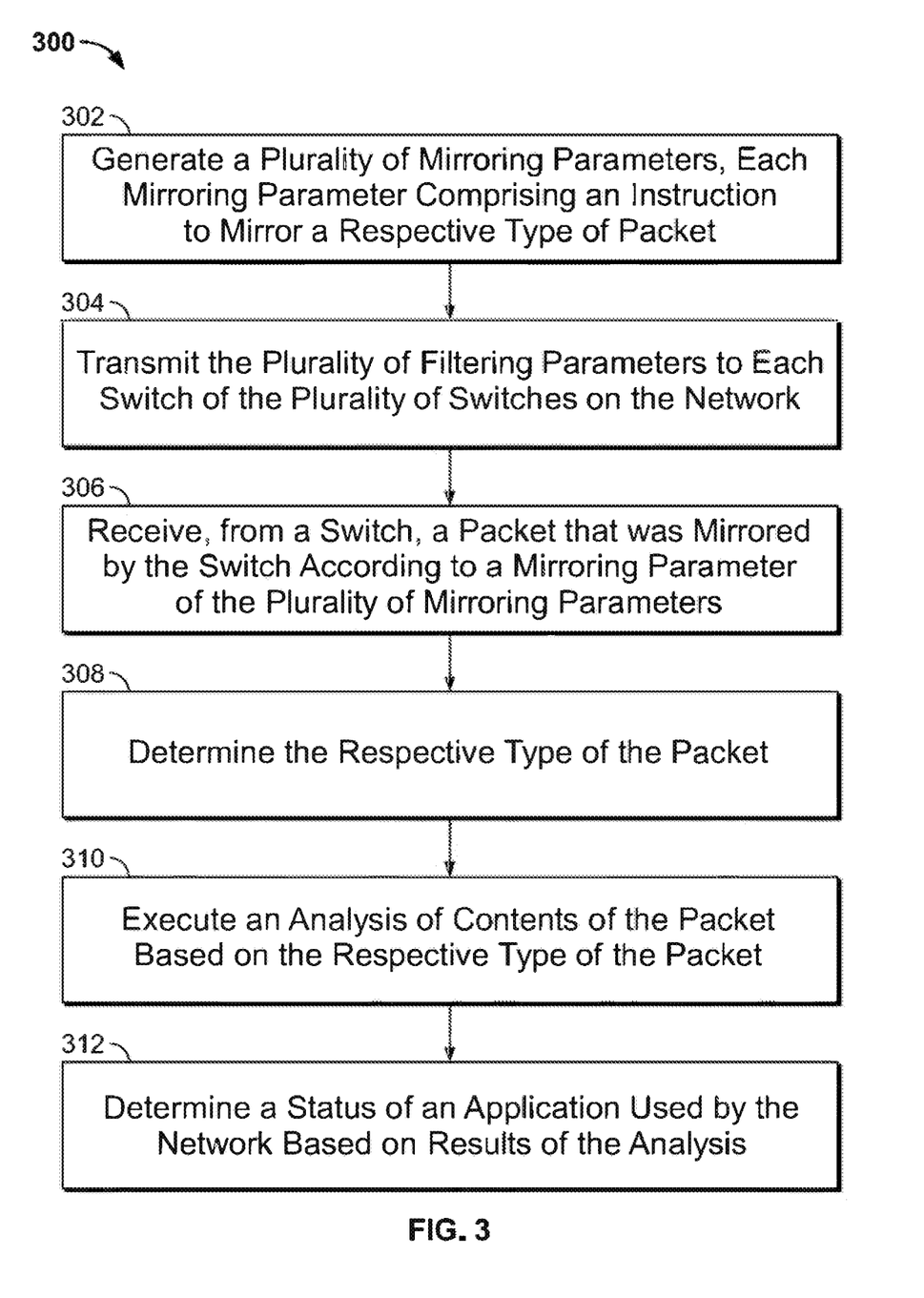
FIG. 3 depicts an illustrative flowchart with an illustrative process for monitoring a status of an application used by a network by selectively mirroring packets transmitted by each switch of a plurality of switches on the network, in accordance with some embodiments of the disclosure.

FIG. 3 depicts an illustrative flowchart with an illustrative process for monitoring a status of an application used by a network by selectively mirroring packets transmitted by each switch of a plurality of switches on the network, in accordance with some embodiments of the disclosure. Process 300 begins at 302, where control circuitry (e.g., control circuitry 204) of a network monitoring device (e.g., server 104) generates a plurality of mirroring parameters (e.g., in the form of an ACL), each mirroring parameter comprising an instruction to mirror a respective type of packet.

Process 300 continues to 304, where control circuitry 204 transmits the plurality of mirroring parameters (e.g., by transmitting an ACL) to each switch of the plurality of switches (e.g., switches 102) on the network (e.g., network 100). At 306, control circuitry 204 receives, from a switch (e.g., a switch 102), a packet that was mirrored by the switch according to a mirroring parameter of the plurality of mirroring parameters. At 308, control circuitry 204 determines the respective type of the packet. At 310, control circuitry 204 executes an analysis of contents of the packet based on the respective type of the packet. At 312, control circuitry 204 determines a status of an application used by the network based on results of the analysis.

Figure 4:
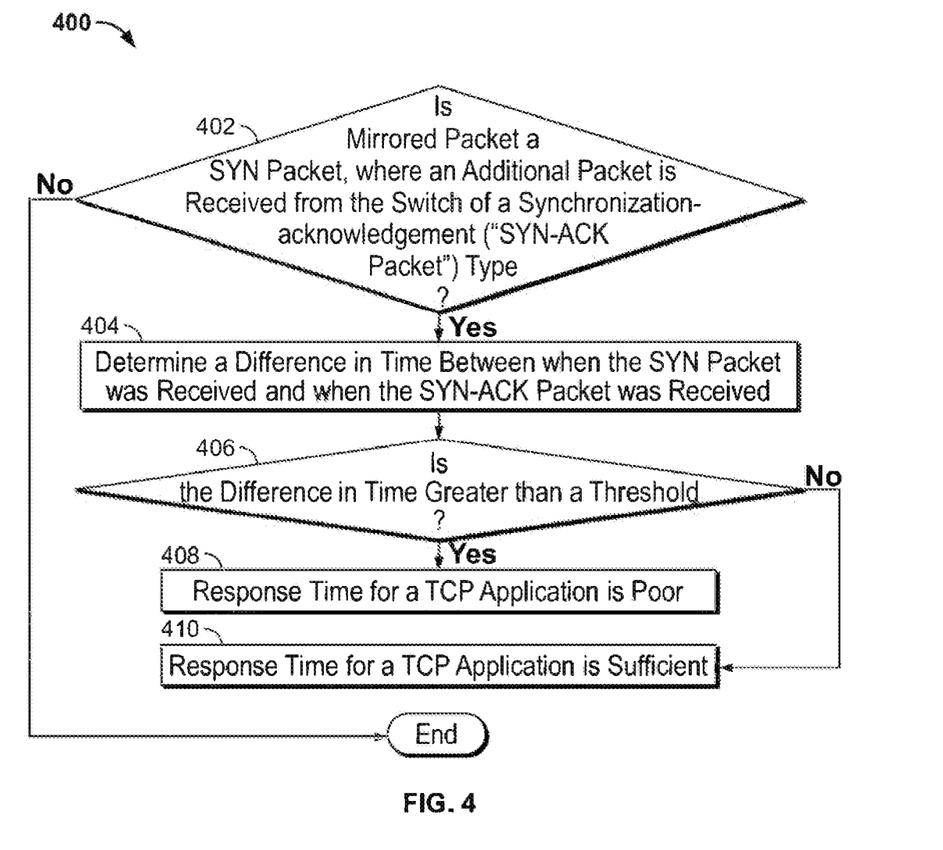
FIG. 4 depicts an illustrative flowchart with an illustrative process for determining a status of an application used by the network based on response time, in accordance with some embodiments of the disclosure.

FIG. 4 depicts an illustrative flowchart with an illustrative process for determining a status of an application used by the network based on response time, in accordance with some embodiments of the disclosure. Process 400 begins at 402, where control circuitry 204 determines whether a received mirrored packet is a SYN packet, where an additional packet is received from the switch of a synchronization-acknowledgement ("SYN-ACK packet") type. If the determination is in the negative, process 400 ends.

If the determination is in the affirmative, process 400 proceeds to 404, where control circuitry 204 determines a difference in time between when the SYN packet was received and when the SYN-ACK packet was received. At 406, control circuitry 204 determines whether the difference in time is greater than a threshold. If the difference in time is greater than the threshold, then control circuitry 204 proceeds to step 408 where control circuitry 204 determines that the status of the application (e.g., a TCP application used by the network) is poor. Otherwise, control circuitry 204 proceeds to step 410, where control circuitry 204 determines that the status of the application is sufficient.

Figure 5:
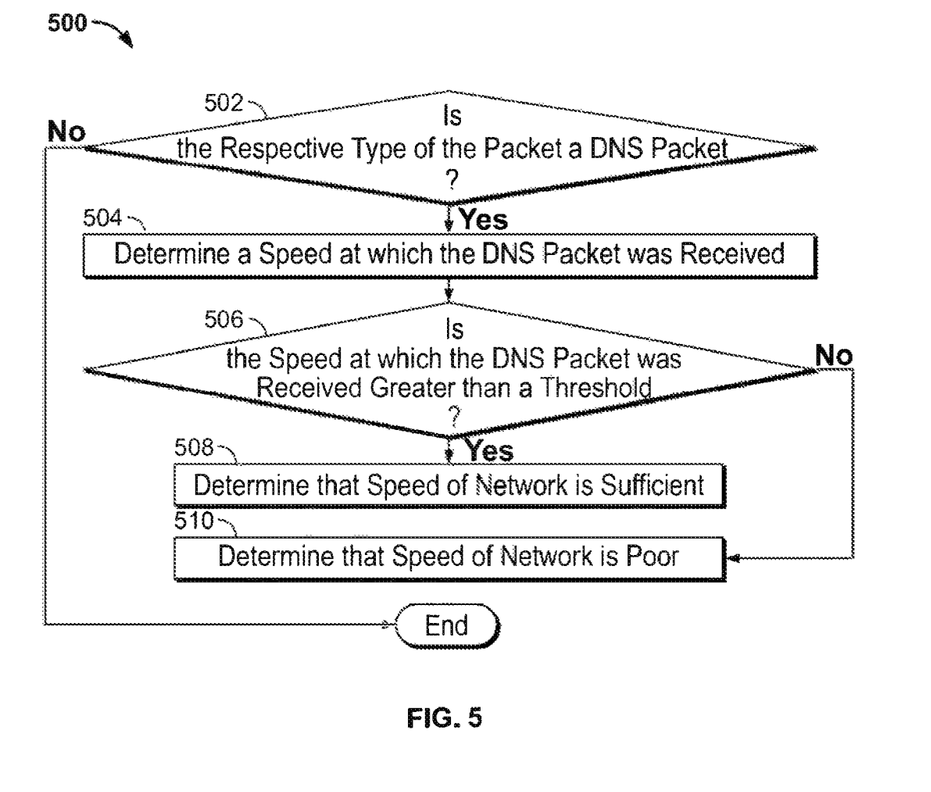
FIG. 5 depicts an illustrative flow chart with an illustrative process for determining a status of an application used by the network based on a mirrored DNS packet, in accordance with some embodiments of the disclosure.

FIG. 5 depicts an illustrative flow chart with an illustrative process for determining a status of an application used by the network based on a mirrored DNS packet, in accordance with some embodiments of the disclosure. Process 500 begins at 502, where control circuitry 204 determines whether the mirrored packet (e.g., as received from a given switch 102) is a DNS packet. If the determination is in the negative, process 500 ends. If the determination is in the affirmative, process 500 proceeds to 504, where control circuitry 204 determines a speed at which the DNS packet was received. At 506, control circuitry 204 determines whether the speed at which the DNS packet was received is greater than a threshold. If the determination is in the affirmative, then control circuitry 204 determines that the speed of the network is sufficient at 508. If the determination is in the negative, control circuitry 204 determines that the speed of the network is poor at 510.

Figure 6:
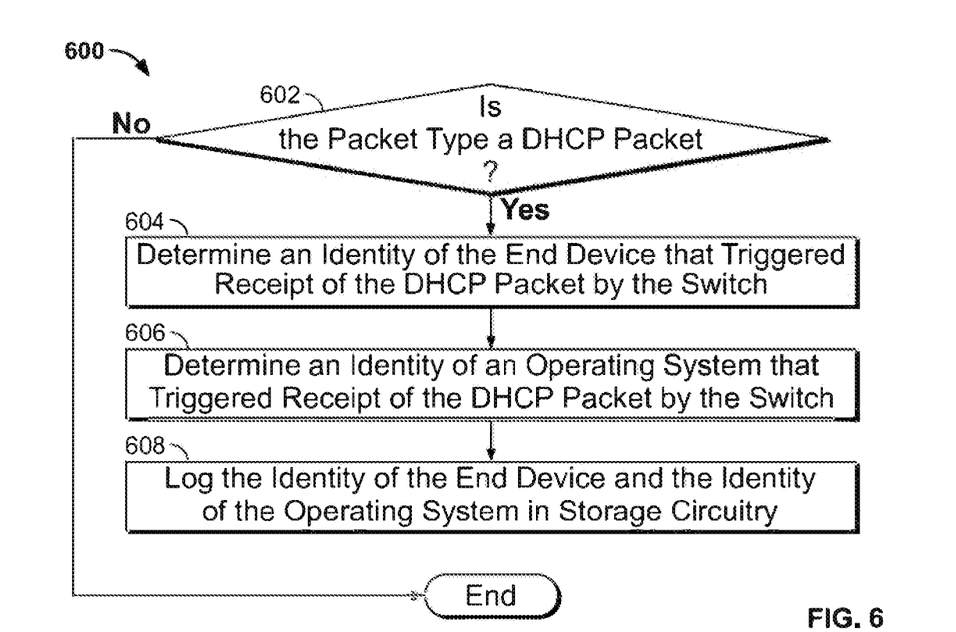
FIG. 6 depicts an illustrative flow chart for determining network attributes based on a mirrored DHCP packet, in accordance with some embodiments of the disclosure.

FIG. 6 depicts an illustrative flow chart for determining network attributes based on a mirrored DHCP packet, in accordance with some embodiments of the disclosure. Process 600 begins at 602, where control circuitry 204 determines whether the packet is of a DHCP packet type. If the determination is in the negative, process 600 ends. If the determination is in the affirmative, process 600 continues to 604, where control circuitry 204 determines an identity of the end device that triggered receipt of the DHCP packet by the switch. For example, control circuitry 204 may extract a device identifier from a header of the DHCP packet or from a header of a different packet originating from the same device. At 606, control circuitry 204 determines an identity of an operating system that triggered receipt of the DHCP packet by the switch. For example, control circuitry 204 may extract, from a header or a payload of the DHCP packet, an operating system identifier. As another example, control circuitry 204 may extract, from a header or a payload of the DHCP packet, data that is unique to a particular operating system, and may determine, based on the data being unique to the particular operating system, the identity of the operating system. At 608, control circuitry 204 logs the identity of the end device and the identity of the operating system (e.g., in storage circuitry 206).

Figure 7:
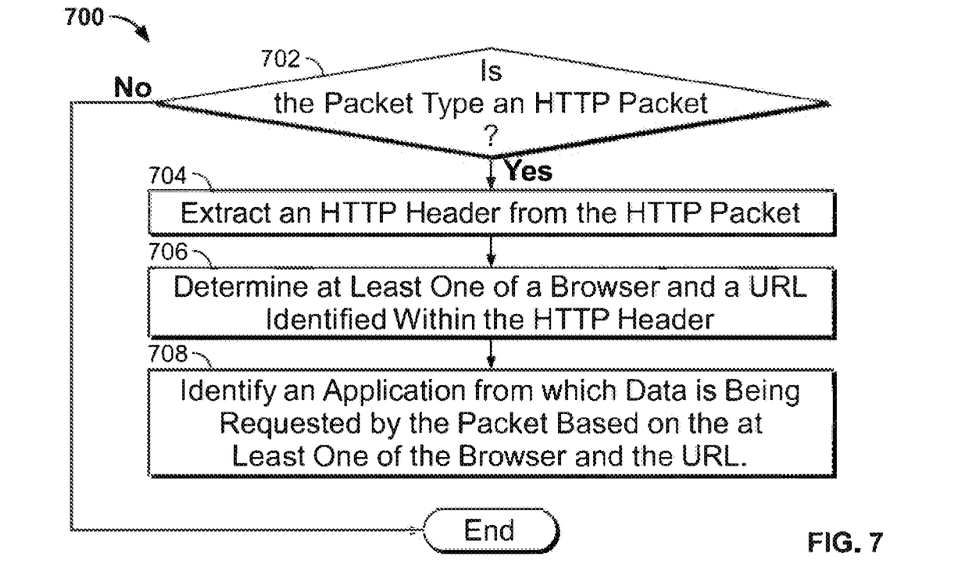
FIG. 7 depicts an illustrative flowchart with an illustrative process for identifying an application of a data flow based on a mirrored HTTP packet, in accordance with some embodiments of the disclosure.

FIG. 7 depicts an illustrative flowchart with an illustrative process for identifying an application of a data flow based on a mirrored HTTP packet, in accordance with some embodiments of the disclosure. Process 700 begins at 702, where control circuitry 204 determines whether the packet type of a packet mirrored by a given switch 204 is an HTTP packet. If the determination is in the negative, process 700 ends. If the determination is in the affirmative, process 700 continues to 704, where control circuitry 204 extracts an HTTP header from the HTTP packet (e.g., by extracting data from one or more fields of the header of the HTTP packet. At 706, control circuitry 204 determines at least one of a browser and a URL identified within the HTTP header (e.g., by comparing the extracted data to known data relating to a browser, or by comparing the extracted data to a template that reflects a URL, and determining that the data matches the template). AT 708, control circuitry 204 identifies an application from which data is being requested by the packet based on the at least one of the browser and the URL. For example, control circuitry 204 may determine, based on a URL, an end service corresponding to the HTTP packet, and may determine, based on a known association between the end service and an application, which application the data is being requested from.

Figure 8:
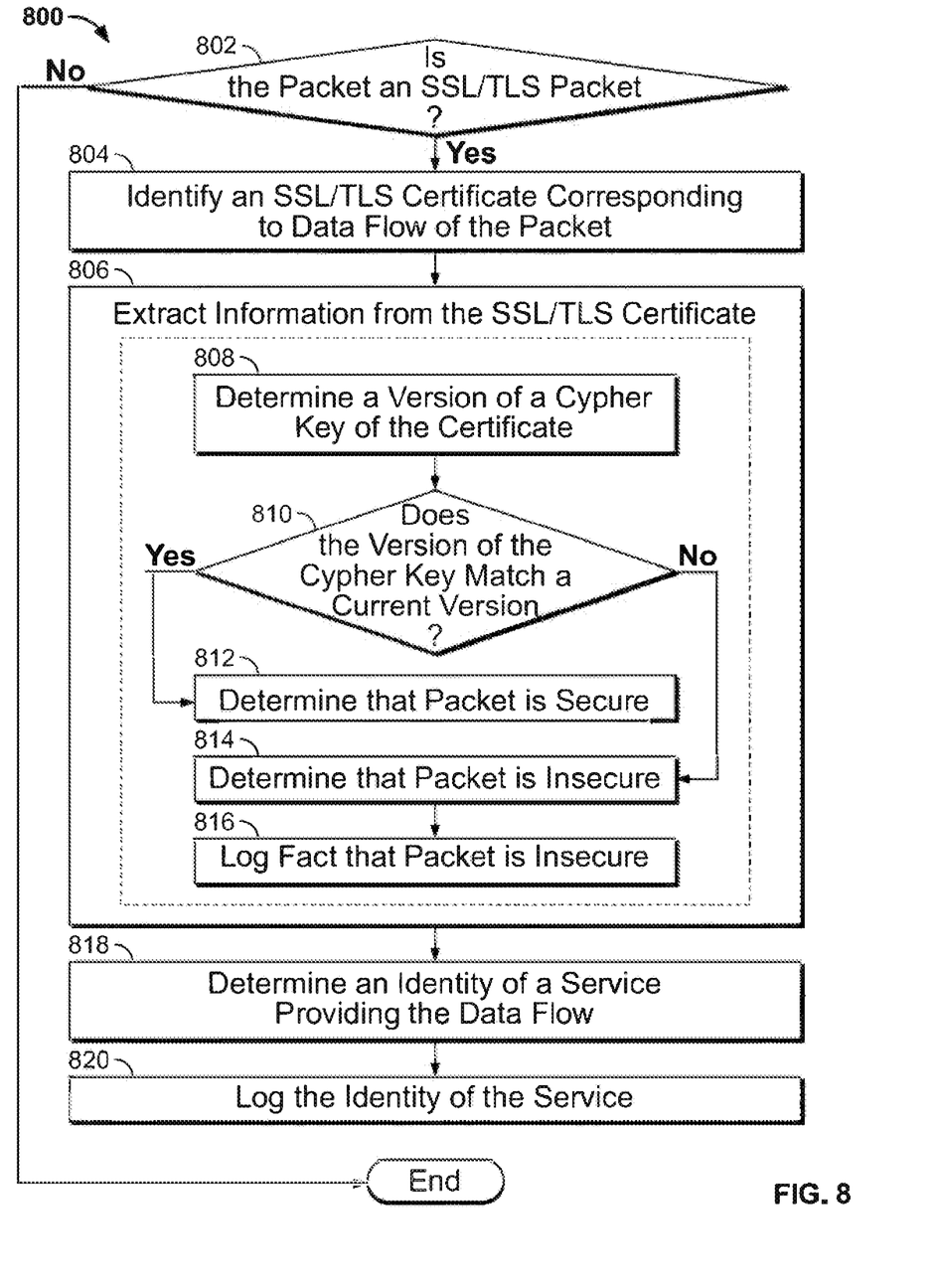
FIG. 8 depicts an illustrative flowchart with an illustrative process for determining an identity of a service based on a certificate of an SSL/TLS packet, in accordance with some embodiments of the disclosure.

FIG. 8 depicts an illustrative flowchart with an illustrative process for determining an identity of a service based on a certificate of an SSL/TLS packet. Process 800 begins at 802, where control circuitry 204 determines whether the packet an SSL/TLS packet. If the determination is in the negative, process 800 terminates. If the determination is in the affirmative, process 800 continues to 804, where control circuitry 204 identifies an SSL/TLS certificate corresponding to data flow of the packet.

At 806, control circuitry 204 extracts information from the SSL/TLS certificate. As an illustrative example, control circuitry may extract a cypher key of the certificate from the information, and at 808, may determine a version of the cypher key. At 810, control circuitry 204 may determine whether the version of the cypher key matches a current version. If the determination is in the affirmative, control circuitry 204 may determine that the packet is secure at 812. If the determination is in the negative, control circuitry 204 may determine that the packet is insecure at 814, and may log the fact that the packet is insecure (e.g., using storage circuitry 206) at 816. Following from 806, control circuitry may determine an identity of a service providing the data flow at 808 based on the extracted information at 818, and may log the identity of the service at 820 (e.g., using storage circuitry 206).

Figure 9:
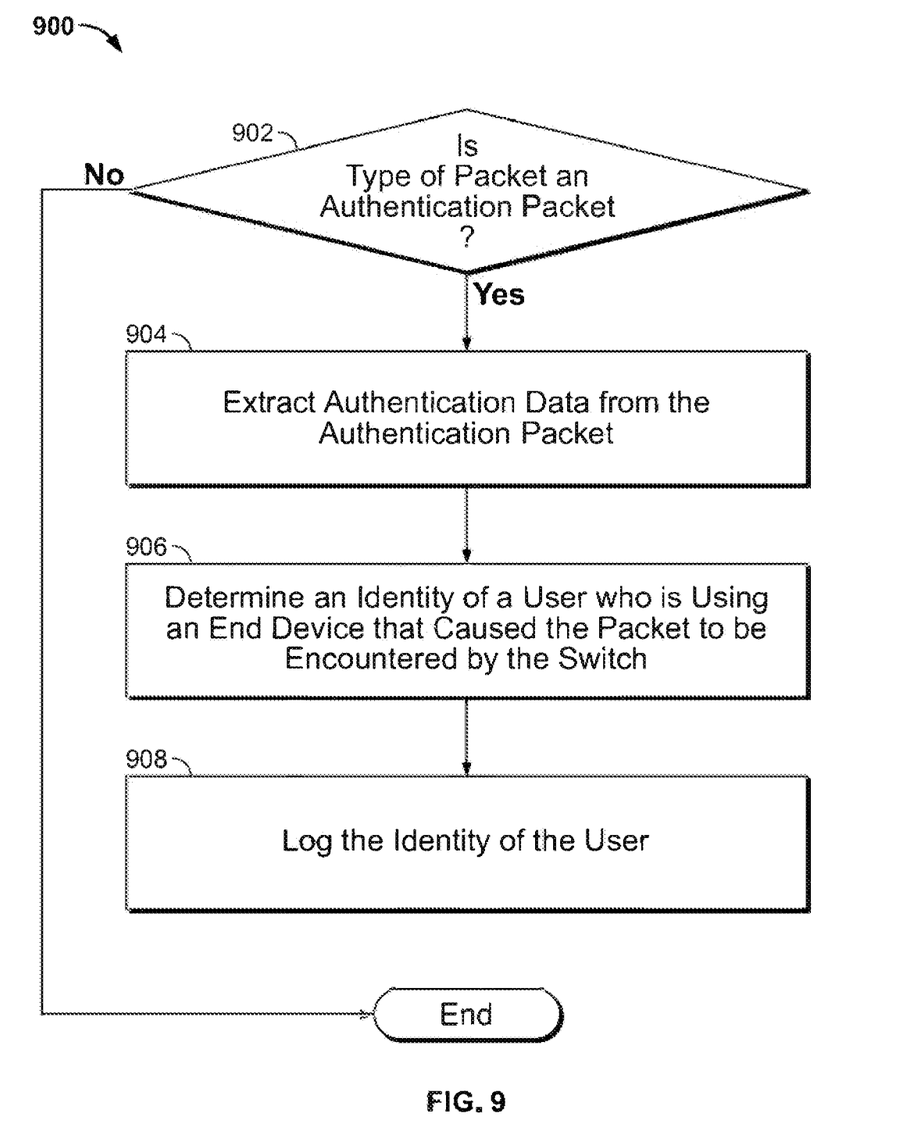
FIG. 9 depicts an illustrative flowchart with an illustrative process for determining an identity of a user based on a mirrored authentication packet, in accordance with some embodiments of the disclosure.

FIG. 9 depicts an illustrative flowchart with an illustrative process for determining an identity of a user based on a mirrored authentication packet, in accordance with some embodiments of the disclosure. Process 900 begins at 902, where control circuitry 204 determines whether the type of packet is an authentication packet. If the determination is in the negative, process 900 ends. If the determination is in the affirmative, process 900 continues to 904. At 904, control circuitry 204 extracts authentication data from the authentication packet. At 906, control circuitry 204 determines an identity of a user who is using an end device that caused the packet to be encountered by the switch. For example, control circuitry 204 may extract, from the authentication packet, data from a user identifier field that identifies the user. At 908, control circuitry 204 logs the identity of the user (e.g., using storage circuitry 206).

For brevity, elements of processes 300-900 that were described in detail with respect to FIGS. 1 and 2 are not repeated in the description of FIGS. 3-9, but those above-described elements are intended to carry into their respective descriptions of FIGS. 3-9.

The foregoing describes systems, methods, and apparatuses for automatically monitoring a status of an application used network 100 based on selectively-mirrored packets from switches 102. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

As referred herein, the term "in response to" refers to initiated as a result of. For example, a first action being performed in response to a second action may include interstitial steps between the first action and the second action.

What is claimed is:

1. A method, comprising:
generating a mirroring parameter that comprises an instruction to mirror a type of packet;
transmitting the mirroring parameter to each switch of a plurality of switches in a network;
receiving one or more packets, each mirrored by a respective one of the plurality of switches based on the mirroring parameter, wherein the one or more packets correspond to a web-based flow between a client and a service; and
determining an identity of a switch of the plurality of switches that dropped an acknowledgement packet corresponding to a packet of the one or more packets, wherein the switch is located along the web-based flow between the client and the service.

2. The method of claim 1, further comprising:
receiving, from a second switch of the plurality of switches, another acknowledgement packet corresponding to another packet of the one or more packets;
analyzing contents of the other packet and the other acknowledgement packet;
determining a time difference between when the other packet was received and when the other acknowledgment packet was received; and
determining a status of an application corresponding to the web-based flow by comparing the time difference to a threshold.

3. The method of claim 1, further comprising:
transmitting an access control list (ACL) to the switch.

4. The method of claim 1, wherein receiving the one or more packets further comprises:
receiving the one or more packets using a sampled flow (SFlow) protocol.

5. The method of claim 1, wherein receiving the one or more packets further comprises:
mirroring the packet of the one or more packets based at least in part on whether the packet comprises data matching a predetermined pattern of the mirroring parameter at a predetermined location.

6. The method of claim 1, wherein the packet is a synchronization (SYN) packet.

7. The method of claim 1, wherein the application is a transmission control protocol (TCP) application.

8. A system, comprising:
communications circuitry; and
control circuitry configured to:
generate a mirroring parameter that comprises an instruction to mirror a type of packet;
transmit the mirroring parameter to each switch of a plurality of switches in a network;
receive one or more packets, each mirrored by a respective one of the plurality of switches based on the mirroring parameter, wherein the one or more packets correspond to a web-based flow between a client and a service;
determine an identity of a switch of the plurality of switches that dropped an acknowledgement packet corresponding to a packet of the one or more packets, wherein the switch is located along the web-based flow between the client and the service.

9. The system of claim 8, wherein the control circuitry is further configured to:
receive, from a second switch of the plurality of switches, an other acknowledgement packet corresponding to an other packet of the one or more packets;
analyze contents of the other packet and the other acknowledgement packet determine a time difference between when the other packet was received and when the other acknowledgment packet was received; and
determine a status of an application corresponding to the web-flow by comparing the time difference to a threshold.

10. The system of claim 8, wherein to receive the one or more packets, the control circuitry is further configured to:
receive the one or more packets using a sampled flow (SFlow) protocol.

11. The system of claim 8, wherein to receive the one or more packets, the control circuitry is further configured to mirror the packet of the one or more packets based at least in part on whether the packet comprises data matching a predetermined pattern of the mirroring parameter at a predetermined location.

12. The system of claim 8, wherein the packet is a synchronization (SYN) packet.

13. The system of claim 8, wherein the control circuitry is further configured to:
transmit an access control list (ACL) to the switch.

14. A non-transitory computer-readable medium having instructions stored thereon that, when executed by at least one computing device, causes the at least one computing device to perform operations comprising:
generating a mirroring parameter that comprises an instruction to mirror a type of packet, wherein the type of packet is a synchronization (SYN) packet;
transmitting the mirroring parameter to each switch of a plurality of switches in a network;
receiving one or more SYN packets each mirrored by a respective one of the plurality of switches based on the mirroring parameter, wherein the one or more SYN packets correspond to a web-based flow between a client and a service; and
determining an identity of a switch of the plurality of switches that dropped an acknowledgement packet corresponding to the SYN packet of the one or more SYN packets, wherein the switch is located along the web-based flow between the client and the service.

15. The non-transitory computer-readable medium of claim 14, the operations further comprising:
receiving, from a second switch of the plurality of switches, an other acknowledgement packet corresponding to an other SYN packet of the one or more SYN packets;
analyzing contents of the other SYN packet and the other acknowledgement packet; and
determining a time difference between when the other SYN packet was received and when the other acknowledgment packet was received; and
determining a status of an application corresponding to the web-based flow by comparing the time difference to a threshold.

16. The non-transitory computer-readable medium of claim 14, the operations further comprising:
transmitting an access control list (ACL) to the switch.

17. The non-transitory computer-readable medium of claim 14, wherein the receiving the one or more SYN packets further comprises:
receiving the one or more SYN packets using a sampled flow (SFlow) protocol.

18. The non-transitory computer-readable medium of claim 14, wherein receiving the one or more SYN packets further comprises:
mirroring the SYN packet of the one or more SYN packets based at least in part on whether the SYN packet comprises data matching a predetermined pattern of the mirroring parameter at a predetermined location.

19. The non-transitory computer-readable medium of claim 16, wherein the SYN packet is mirrored based on a match between the mirroring parameter of the ACL and a parameter of the SYN packet.

20. The non-transitory computer-readable medium of claim 14, wherein the application is a transmission control protocol (TCP) application.

* * * * *

UNITED STATES PATENT AND TRADEMARK OFFICE
CERTIFICATE OF CORRECTION

PATENT NO. : 11,909,606 B2
APPLICATION NO. : 17/537160
DATED : February 20, 2024
INVENTOR(S) : Grosser et al.

Page 1 of 1

It is certified that error appears in the above-identified patent and that said Letters Patent is hereby corrected as shown below:

In the Claims

In Column 12, Claim 9, Line 55, delete "an other" and insert -- another --, therefor.

In Column 12, Claim 9, Lines 55-56, delete "an other" and insert -- another --, therefor.

In Column 12, Claim 9, Line 58, delete "packet" and insert -- packet; --, therefor.

In Column 12, Claim 9, Line 62, delete "Web- flow" and insert -- web-based flow --, therefor.

In Column 13, Claim 14, Line 20, delete "packets" and insert -- packets, --, therefor.

Signed and Sealed this
Twenty-ninth Day of April, 2025

Coke Morgan Stewart
*Acting Director of the United States Patent and Trademark Office*